(12) United States Patent
McGrath et al.

(10) Patent No.: US 7,544,764 B2
(45) Date of Patent: Jun. 9, 2009

(54) SULFONATED POLYMER COMPOSITION FOR FORMING FUEL CELL ELECTRODES

(75) Inventors: James E. McGrath, Blacksburg, VA (US); Michael Hickner, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 581 days.

(21) Appl. No.: 10/509,736

(22) PCT Filed: Apr. 1, 2003

(86) PCT No.: PCT/US03/09918

§ 371 (c)(1),
(2), (4) Date: Jun. 22, 2005

(87) PCT Pub. No.: WO03/082956

PCT Pub. Date: Oct. 9, 2003

(65) Prior Publication Data

US 2006/0036064 A1    Feb. 16, 2006

(51) Int. Cl.
  *C08G 65/34*    (2006.01)
  *C08G 65/48*    (2006.01)
  *C08G 65/00*    (2006.01)
  *C08G 75/00*    (2006.01)

(52) U.S. Cl. .............. 528/391; 528/364; 528/363; 528/373; 521/27; 521/33; 429/209; 429/212; 429/213

(58) Field of Classification Search .......... 528/391, 528/364, 363, 373; 521/27, 33; 429/209, 429/212, 213
  See application file for complete search history.

(56) References Cited

FOREIGN PATENT DOCUMENTS

WO    WO 02/25764    *  3/2002

OTHER PUBLICATIONS

Wang, et al., Synthesis of sulfonated poly(Arlene ether sulfone)s via direct polymerization, Mar. 2000, Chem Abstract 132: 334953.

* cited by examiner

*Primary Examiner*—Duc Truong
(74) *Attorney, Agent, or Firm*—Whitham Curtis Christofferson & Cook, P.C.

(57) ABSTRACT

A membrane electrode assembly for a fuel cell is described. The materials for the membrane electrode assembly are formed from sulfonated polymers. A polymer dispersion ink containing the sulfonated polymer and a mixture of solvents is used to form the electrodes on the exchange membrane. The dispersion ink allows for the electrodes to be formed directly on the exchange membrane without significantly dissolving the exchange membrane.

7 Claims, 1 Drawing Sheet

SULFONATED POLYMER COMPOSITION FOR FORMING FUEL CELL ELECTRODES

STATEMENT OF GOVERNMENT INTEREST

This invention was made with government support under Contract Number EHR-0090556 awarded by the National Science Foundation. The Government has certain rights in the invention.

FIELD OF THE INVENTION

The present invention is directed to composition for forming electrodes for a fuel cell. Further, the invention includes a fuel cell membrane electrode assembly based on ion-conducting sulfonated polymeric materials, where the sulfonated polymeric materials may be used in the formation of the electrode as well as the proton exchange membrane.

BACKGROUND OF THE INVENTION

Polymer electrolyte fuel cells (PEFCs) have great potential as an environmentally friendly energy source. Fuel cells have been used in the space program since the 1960's, but recently with the focus on "green" resources, fuel cells have come to the forefront of commercialization. Specifically, fuel cells are being explored for use in automobiles, electronics, and stationary power applications.

A polymer electrolyte fuel cell typically includes membrane electrode assembly ("MEA") positioned between a pair of gas diffusion layers. The MEA typically includes a cathode and an anode with an exchange membrane positioned between the anode and cathode. A catalyst is used in proximity to the cathode and the anode.

For the last 30 years, the industry standard for the proton exchange membrane (PEM) as well as the electrodes for the fuel cell has been Nafion® (polyperfluoro sulfonic acid) by DuPont.

Nafion® materials display sufficient proton conductivity (~0.1 S/cm), good chemical resistance, and mechanical strength. Some of the disadvantages of Nafion® materials include high cost, reduced conductivity at high temperatures (>80° C.), and high methanol permeability in direct methanol fuel cells.

Because of the renewed interest in fuel cells and the challenge of high temperature and direct methanol operation, new materials have been explored as potential replacements for Nafion®. Previous work has focused on sulfonated polystyrene, styrene-butadiene block copolymers, or poly(arylene ether)s such as PEEK. Typically, these polymers were all made by a post-sulfonation polymer modification reaction where the sulfonic acid groups are attached to the already formed polymer backbone.

SUMMARY OF THE INVENTION

Accordingly, the present invention is directed to a membrane electrode assembly. The membrane electrode assembly comprises an anode, a cathode, and a proton exchange membrane positioned between the anode and cathode, where at least one of the anode, the cathode, and the proton exchange membrane comprises a sulfonated copolymer having the following chemical structure:

$$\left[\left(\underset{HO_3S}{\underset{|}{\bigcirc}}-Y-\underset{|}{\overset{SO_3H}{\bigcirc}}\right)_n \bigg/ \left(\bigcirc-Y-\bigcirc\right)_m - O-\bigcirc-Z-\bigcirc-O\right]_k$$

In the above chemical structure n/m+m ranges from about 0.001 to about 1, Y may be —S—, S(O), S(O)$_2$, C(O), P(O)(C$_6$H$_5$), or combination thereof, and Z may be a direct carbon—carbon single bond, C(CH$_3$)$_2$, C(CF$_3$)$_2$, C(CF$_3$)(C$_6$H$_5$), C(O), S(O)$_2$, or P(O)(C$_6$H$_5$).

The membrane electrode assembly may also have at least one of the anode, the cathode, and the proton exchange membrane comprising an inorganic heteropoly acid. The inorganic heteropoly acid may be phosphotungstic acid, phosphomolybdic acid, zirconium hydrogen phosphate, or a zirconium containing heteropoly acid. Further, the inorganic heteropoly acid may range from about 0.01 to about 60% by weight.

In certain preferred embodiments n/n+m ranges from about 0.3 to about 0.6. In other embodiments, Y may be S(O)$_2$ and Z is a direct carbon-carbon single bond.

Still further, the membrane electrode assembly may include the proton exchange membrane and at least one of the anode and cathode comprised of the same sulfonated copolymer.

Another embodiment of the membrane electrode assembly comprises an anode, a cathode, and a proton exchange membrane positioned between the anode and cathode, where the proton exchange membrane and at least one of the anode and the cathode comprises a sulfonated polysulfone which has at least one sulfonate moiety on a deactivated aromatic ring adjacent to a sulfone functional group of a polysulfone.

The present invention also includes an electrode casting solution comprising a sulfonated polymer dispersed in a solvent in an amount up to about 20% by weight, where the solvent is adapted to cast the sulfonated polymer on a substrate and is adapted to substantially maintain the integrity of the substrate. The electrode casting solution may include a combination of one or more solvents selected from the group of water, isopropyl alcohol, acetone, N,N-dimethylacetamide, 1-methyl-2-pyrrolidinone, 1,3-dioxolane, 2-methoxy ethanol, or benzyl alcohol. The electrode casting solution may also include N,N-dimethylacetamide or 1-methyl-2-pyrrolidinone and a combination of two or more solvents selected from the group of water, isopropyl alcohol, acetone, 1,3-dioxolane, 2-methoxy ethanol, or benzyl alcohol.

In certain embodiments, the electrode casting solution may further comprise a water retention additive. The water retention additive may be phosphotungstic acid, phosphomolybdic acid, zirconium hydrogen phosphate, or a zirconium containing heteropoly acid. The electrode casting solution may also further comprise a catalyst dispersed in the casting solution.

Still further, the electrode casting solution may include a sulfonated polymer having the following chemical structure:

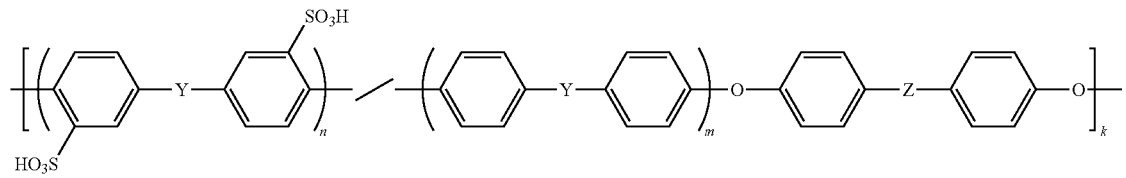

where, n/m+m ranges from about 0.001 to about 1, Y may be —S—, S(O), S(O)$_2$, C(O), P(O)(C$_6$H$_5$), or combinations thereof, and Z may be a direct carbon—carbon single bond, C(CH$_3$)$_2$, C(CF$_3$)$_2$, C(CF$_3$)(C$_6$H$_5$), C(O), S(O)$_2$, or P(O)(C$_6$H$_5$).

The present invention also includes, an electrode for a fuel cell, the electrode comprising a sulfonated copolymer having the following chemical structure:

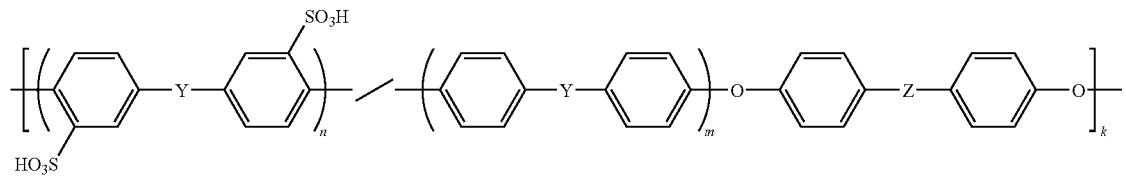

where n/m+m ranges from about 0.001 to about 1, Y may be —S—, S(O), S(O)$_2$, C(O), P(O)(C$_6$H$_5$), or combination thereof, and Z may be a direct carbon—carbon single bond, C(CH$_3$)$_2$, C(CF$_3$)$_2$, C(CF$_3$)(C$_6$H$_5$), C(O), S(O)$_2$, or P(O)(C$_6$H$_5$).

The electrode may include phosphotungstic acid, phosphomolybdic acid, zirconium hydrogen phosphate, or a zirconium containing heteropolyacid. The electrode may also include a catalyst.

Still further the invention includes an electrode for a fuel cell, the electrode comprising a sulfonated polysulfone having at least one sulfonate moiety on a deactivated aromatic ring adjacent to a sulfone functional group of a polysulfone. The electrode may include phosphotungstic acid, phosphomolybdic acid, zirconium hydrogen phosphate, or a zirconium containing heteropoly acid. Still further, the electrode may include a catalyst.

DETAILED DESCRIPTION OF EMBODIMENTS OF THE INVENTION

Figure 1:
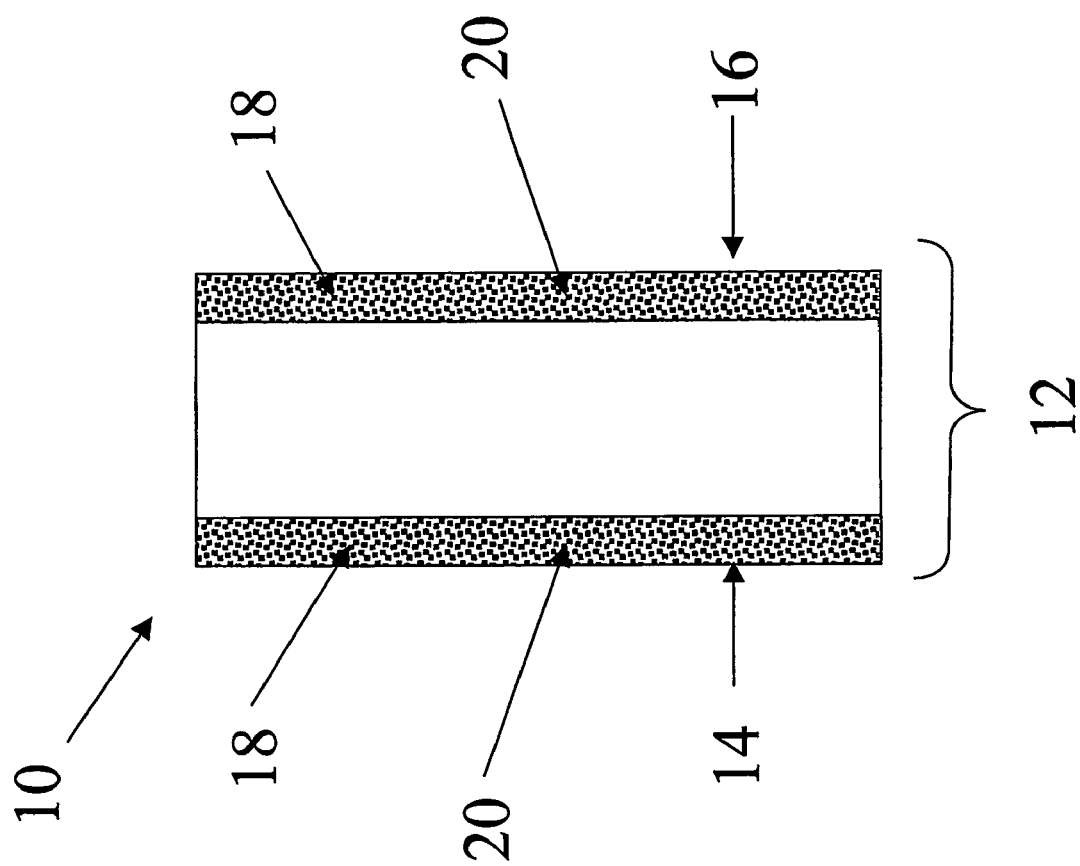
FIG. 1 is a schematic representation of a portion of a fuel cell in accordance with an embodiment of the present invention.

The present invention includes a composition used for the formation of electrodes for the construction of an MEA, where one or more of the electrodes are made from an ion-conducting sulfonated polymeric material. The composition is particularly advantageous when forming electrodes on a polymer exchange membrane formed of an ion-conducting sulfontated polymer, where the membrane and the electrodes contain the same type of ion-conducting sulfonated polymer.

The types of ion-conducting sulfonated polymeric materials used in embodiments of the present invention are described in U.S. patent application Ser. No. 09/956,256, entitled "Ion-Conducting Sulfonated Polymeric Materials," filed Sep. 20, 2001, herein specifically incorporated by reference in its entirety.

The ion-conducting sulfonated polymeric materials used with the present invention are formed by the direct polymerization of sulfonated monomers. By using sulfonated monomers in the polymerization process, the concentration of sulfonated monomers may be varied with respect to an unsulfonated monomer and a comonomer to control the concentration of sulfonate groups in the resulting copolymer.

Further, by using sulfonated monomers, control over the location of the sulfonate group on the polymer is also achieved. For example, as illustrated in Structure 1, the post-polymerization sulfonation of the bisphenol poly(arylene ether sulfone) results in the sulfonation of the activated ring. By starting with the sulfonated monomer, followed by direct polymerization, sulfonation is maintained on the deactivated ring, as shown in Structure 2. By controlling the concentration and location of sulfonate groups in the polymer, various properties of the resulting membrane, such as conductivity and water content, may be controlled. Direct polymerization of sulfonated monomers allows for well-defined ion conductor locations, high protonic conductivity, and enhanced stability over polymer electrolytes synthesized by post-sulfonation reactions.

Structure 2

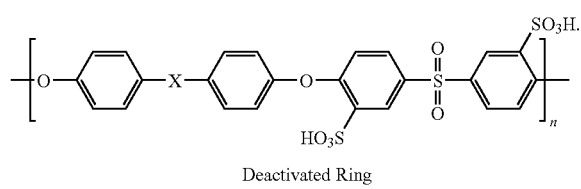

Deactivated Ring

As used herein, "sulfonate" or "sulfonated" refers to a sulfonate group, i.e., —SO$_3$, either in the acid form (—SO$_3$H, sulfonic acid) or a salt form (—SO$_3$Na). The cation for the salt form may be lithium, sodium, potassium, cesium, or other metal, inorganic, or organic cation. Further, when the term "polymer" is used, it is used broadly and includes, but is not limited to, homopolymers, random copolymers, and block copolymers.

The sulfonated activated aromatic dihalide is prepared by sulfonation of the corresponding activated aromatic dihalide by sulfonation methods known to those skilled in the art. This sulfonated activated aromatic dihalide may then used in the formation of the sulfonated copolymer. The general reaction scheme for forming the sulfonated copolymer is shown in Scheme 1 below.

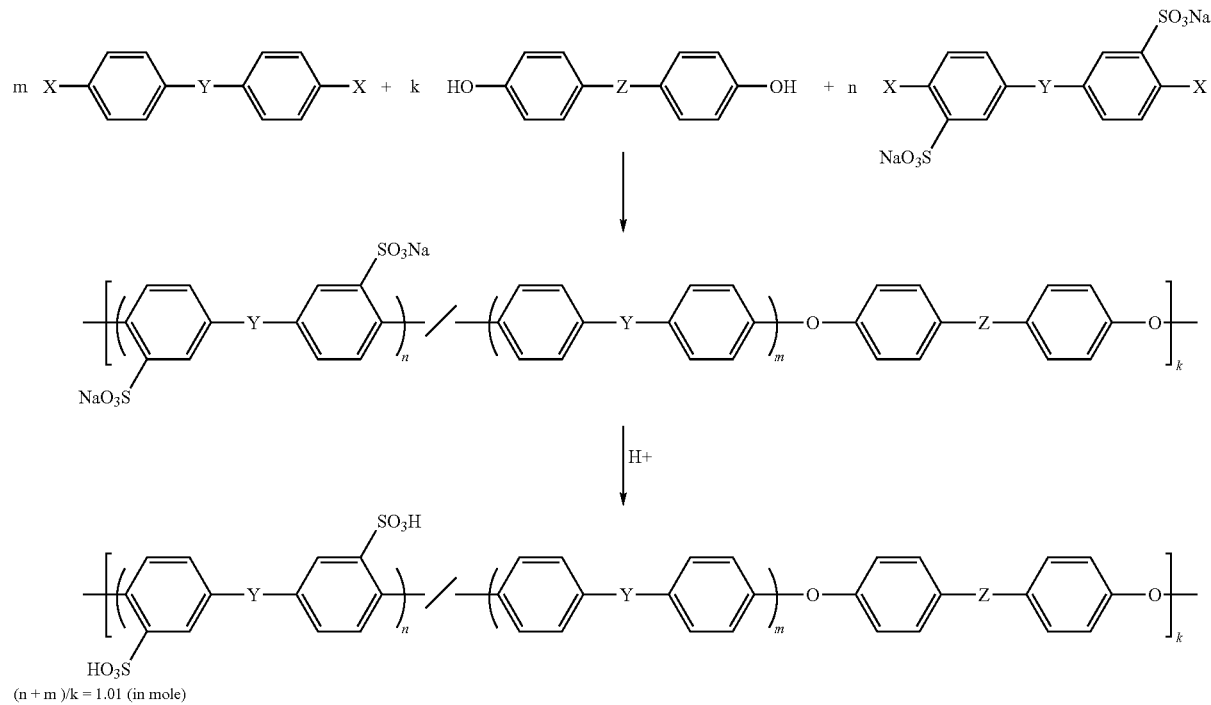

Many different types of sulfonated polymers may be formed in accordance with the present invention. Control over the concentration and location of the sulfonate groups on the polymer may be achieved by using the appropriate sulfonated monomer in conjunction with a suitable comonomer. Specific examples of the types of polymers include, but are not limited to, polysulfones, polyimides, polyketones, and poly(arylene ether phosphine oxide)s.

For fuel cell applications, it is important that the proton exchange membrane of the fuel cell be conductive and have good mechanical strength. Aromatic polymers, such as poly(arylene ether sulfone)s, typically have excellent thermal and mechanical properties, as well as resistance to oxidation and acid catalyzed hydrolysis. These properties typically improve when the number of aliphatic units is decreased.

Generally, the invention uses polymers prepared from the direct polymerization of a sulfonated activated aromatic monomer, an unsulfonated activated aromatic monomer, and a comonomer, such as bisphenol, to form a sulfonated aromatic copolymer. Activating groups for the monomers may include —S—, —S(O)—, —S(O)$_2$—, —C(O)—, and —P(O)(C$_6$H$_5$)—. The monomers may be in the dihalide or dinitro form. Halides would include, but are not limited to Cl, F, and Br.

In scheme 1, Y may be any group that activates the leaving group X. In one embodiment Y may include, but is not limited to, —S—, S(O)—, —S(O)$_2$—, —C(O)—, —P(O)(C$_6$H$_5$)— or combinations thereof. The activating group for the sulfonated monomer may be the same or different from the unsulfonated monomer. X may be any activated leaving group such as a dihalide or a dinitro group. Preferable dihalides include, but are not limited to, Cl, F, or Br. In the bisphenol, Z may be a direct carbon-carbon single bond, —C(CH$_3$)$_2$—, —C(CF$_3$)$_2$—, —C(CF$_3$)(C$_6$H$_5$)—, —C(O)—, —S(O)$_2$—, or —P(O)(C$_6$H$_5$)—. Further, while Scheme 1 is illustrated using phenyl groups as the aromatic group, other aromatic moieties may be used. These include, but are not limited to phenyl, napthyl, terphenyl, and combinations thereof.

The molar ratio of sulfonated activated aromatic monomer to activated aromatic monomer may range from about 0.001 to about 0.999. The comonomer, such as bisphenol, is used in sufficient stoichiometric amounts to produce the sulfonated copolymer.

The following discussion will be with respect to the formation of a sulfonated polysulfone; however, one skilled in the art will understand that much of the discussion is applicable to the other types of polymers discussed above and are within the scope of the present invention.

Certain embodiments of the present invention described below use sulfonated polymers that include a sulfonated aromatic sulfone where there is at least one sulfonate moiety on an aromatic ring adjacent to a sulfone functional group of a polysulfone. The aromatic ring, due to its proximity to the sulfone group, is deactivated for sulfonation reactions. Sulfonation on the deactivated aromatic ring is accomplished by sulfonating the corresponding monomer followed by polymerization to form the polysulfone. In this way, sulfonation of the deactivated ring is maintained.

The formation of the sulfonated polysulfone polymer takes place by selecting or creating the desired sulfonated monomer, which is typically in the form of a dihalide. The sulfonated monomer is then condensed with an appropriate comonomer, such as a bisphenol, to form the sulfonated polysulfone polymer. The sulfonated monomer may be added alone or in conjunction with an unsulfonated monomer. One particularly useful sulfonated monomer is 3,3'-disulfonated 4,4' dichlorodiphenyl sulfone (SDCDPS), shown in structure 3. While the dichloro-form is discussed, other dihalide forms, such as the fluoro-form may be used.

Structure 3

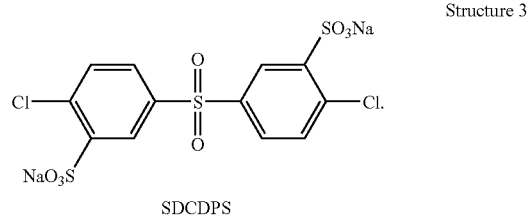

SDCDPS

As mentioned earlier, an unsulfonated monomer may be added with the sulfonated monomer to form the sulfonated copolymer. The unsulfonated monomer may vary depending on the desired properties of the resulting polymer or membrane. When 3,3'-disulfonated 4,4' dichlorodiphenyl sulfone is used, one useful unsulfonated monomer is 4,4'-dichlorodiphenyl sulfone (DCDPS). The relative molar ratio of sulfonated monomer to unsulfonated monomer will vary depending on the desired properties of the material and can range from about 0.001 to about 1, preferably from about 0.3 to about 0.6. As mentioned above, other activating groups other than the sulfone group may be used.

The comonomer used to form the polysulfone may also vary depending on the desired properties and application of the resulting membrane. In one embodiment, bisphenol is used as the comonomer. For proton exchange membranes where mechanical strength and heat tolerance is important, 4,4'-biphenol, hydroquinone, 6F-bisphenol, phenyl phosphine oxide bisphenol, or other aromatic bisphenols may be used as the comonomer. Further, the bisphenol may include additional aliphatic or aromatic substituents.

One embodiment of the invention includes the direct condensation of 3,3'-disulfonated 4,4' dichlorodiphenyl sulfone and dichlorodiphenyl sulfone with 4,4'-biphenol to form sulfonated poly(arylene ether sulfone)s as shown in Scheme 2.

Scheme 2. Synthesis of sulfonated poly(arylene ether sulfone)s.

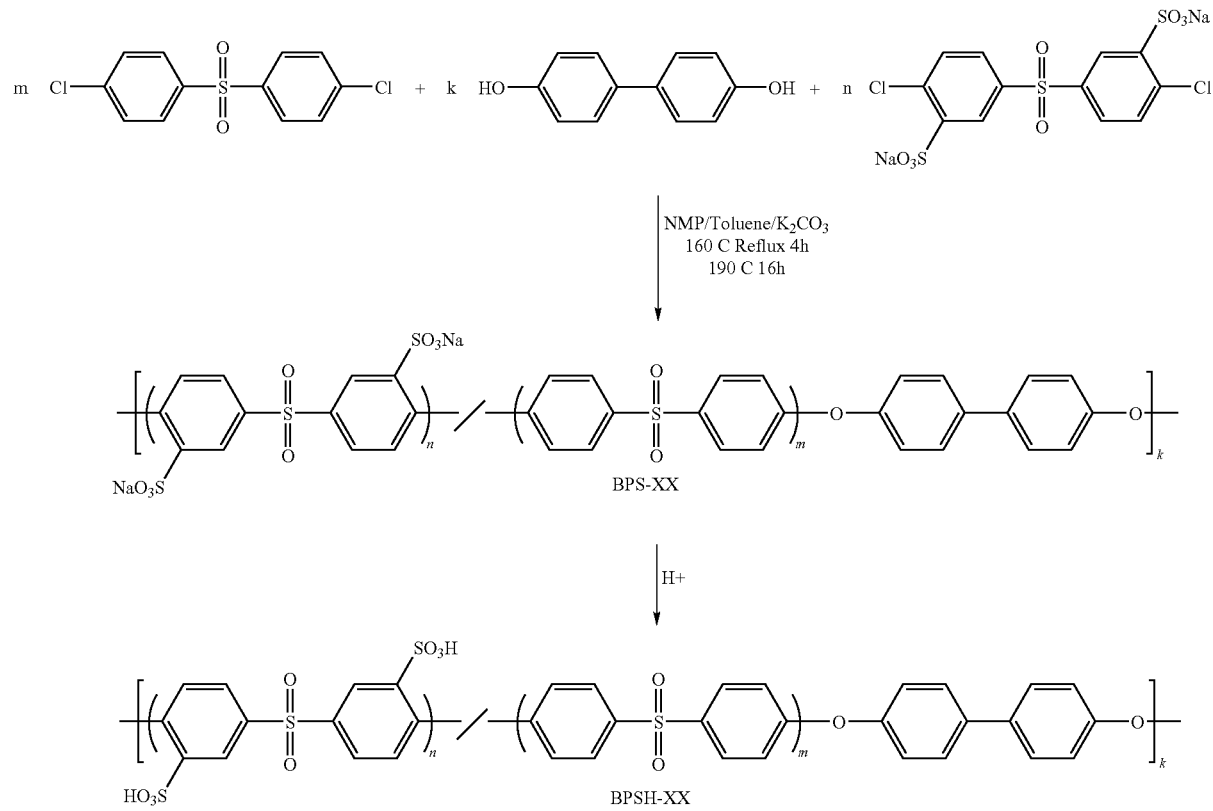

$(n + m)/k = 1.01$ (in mole); $XX = 100n/(n + m)$

While scheme 2 illustrates SDCPDS and DCPDS condensing with 4,4'-biphenol, it should be understood that these materials contemplate using any aromatic sulfonated monomer including one or more aromatic groups and one or more sulfonate moieties located on the aromatic groups which includes leaving groups that react with corresponding leaving groups on any comonomer, particularly including, but not limited to, bisphenols, by a condensation reaction. The comonomer may itself be substituted with a sulfonate moiety. The polymer produced includes a molar ratio of sulfonated activated aromatic monomer to activated aromatic monomer ranging from about 0.001 to about 1, and preferably from about 0.3 to about 0.6.

Having described the sulfonated polymers used in the present invention, certain embodiments of the present invention will now be described. The above described polymers will generally be referred to as "sulfonated polymers" or "sulfonated copolymers." In certain embodiments, the sulfonated polymers are used as the material in the electrodes and the proton exchange membrane to form a membrane electrode assembly (MEA).

One suitable method for forming a proton exchange membrane includes dissolving one or more of the above-described sulfonated polymers in a suitable solvent such as N,N-dimethylacetamide (DMAc) followed by casting onto a suitable substrate such as glass. The sulfonated polymers of the present invention exhibit conductivities suitable for fuel cell applications and are typically above about 0.005 S/cm.

To form the MEA, electrodes are positioned on each side of the exchange membrane. The electrodes are preferably formed from the same polymer as the exchange membrane. Using the same type of polymer for the electrode and the membrane provides good adhesion of the electrodes to the membrane and potentially lower interfacial resistance between the membrane electrode assembly layers. Dissolving the sulfonated polymer in DMAc as discussed above to cast the electrodes on the membrane is not desirable because the polymer in DMAc will dissolve the previously cast exchange membrane and substantially reduce the integrity of the exchange membrane.

To avoid this problem, an electrode casting dispersion of the sulfonated polymer is prepared that can be cast on the exchange membrane without substantially reducing the integrity of the exchange membrane. The electrode casting dispersion contains a dispersion of the sulfonated polymer. The electrode casting dispersion should have a sufficient amount of the dispersed sulfonated polymer to allow for the formation of an electrode. In certain embodiments, the electrode casting dispersion contains up to about 20% of the dispersed polymer by weight. Preferably, the dispersed polymer range from about 2 to about 10% by weight. The size of the polymer particles in the dispersion are not particularly limited provided that the dispersion is suitable for casting on a substrate. In some embodiments of the invention, the particle sizes of the polymer dispersion preferably range from about 10 nm to about 60 nm.

The solvents used for the electrode casting dispersion are preferably a combination of solvents that will not substantially reduce the integrity of the exchange membrane. The combination of solvents may vary depending the type of sulfonated polymer to be used. The solvents may include, but are not limited to, a combination of any of the following solvents: water, isopropyl alcohol (IPA), acetone, N,N-dimethylacetamide (DMAc), 1-methyl-2-pyrrolidinone (NMP), 1,3-dioxolane, 2-methoxy ethanol, or benzyl alcohol. Single, binary (two different solvents), and tertiary (three different solvents) solvent combination are most useful with a polymer concentration ranging from about 2 to about 10%. When DMAc or NMP is used as one of the solvents, the solvent combination preferably should not include more than about 10% DMAc or NMP in order to avoid reducing the integrity of the exchange membrane. Greater amounts may be acceptable depending on the other solvent used in the dispersion as well as the polymer being used.

In certain embodiments, the solvent may be a binary mixture of water and one other solvent. In other embodiments, DMAc or NMP is preferably used in tertiary solvent mixtures. Further the solvent combination may include a mixture of DMAc and NMP with other solvents, preferably with two or more other solvents.

Some exemplary solvent combinations for the electrode casting dispersion include, but are not limited to, a solution containing 50% acetone and 50% water; a solution of 20% 2-methoxyethanol and 80% water; a solution of 10% DMAc with 45% water and 45% isopropyl alcohol.

The electrode casting solution may be used to cast the electrode directly on the exchange membrane or other substrates such as glass or a Teflon or Kapton substrate such as a decal for hot pressing the electrode on the membrane.

The preparation of the electrode casting solution is not particularly limited as long as the method results in a substantially uniform dispersion of the sulfonated polymer in the solvent. When DMAc or NMP is used as one of the solvent components, it is preferable that the polymer is dissolved in a high concentration of up to about 40% by weight followed by addition to the other solvents. For example, the acid form of the sulfonated polymer may be dissolved in DMAc at a concentration up to about 40%. The sulfonated polymer/DMAc solution may then be added slowly to a solution of 50% EPA and 50% water, or other solvent combination. Vigorous stirring during the addition is preferable to homogeneously disperse the sulfonated polymer in the solution. Preferably heat is used in conjunction with vigorous stirring to aid in the dispersion of the polymer in the solvents.

Another method for dispersing the polymer in the solvent to form the electrode casting solution includes adding the acid form of the polymer to a single, binary, or tertiary solvent combination. Vigorous stirring or sonication may be used to disperse the polymer and form a substantially homogeneous solution. Heat may also be used to aide in the dispersion of the polymer in the solvents.

Various additives that are to be included in the electrode may be added to the electrode casting solution. For example, water retention additives may be added to the electrode casting solution. Water retention additives are used to help retain water in the polymer on a local scale to increase proton conduction at low levels of hydration. Suitable water retention additives include, but are not limited to, heteropoly acids such as inorganic heteropoly acids. The weight ratio of heteropoly acid to sulfonated polymer may range up to about 60%. Preferably, the weight ratio of the heteropoly acid ranges from about 5% to about 60%. The ratio will vary depending on the type of the sulfonated polymer and the type of the heteropoly acid used. The types of heteropoly acids include but are not limited to, phosphotungstic acid, phosphomolybdic acid, zirconium hydrogen phosphate, and zirconium containing heteropoly acids.

By including the water retention additive in the electrode casting solution, when the electrode is cast on the exchange membrane, the water retention additive will be dispersed in the electrode.

The electrodes will also have a catalyst either on one surface of the electrode or dispersed within the electrode. For embodiments where the catalyst is dispersed through the electrode, the catalyst may be added to the electrode casting solution. The types of catalysts are well-known in the art and include both supported and unsupported catalysts. Examples of catalysts include, but are not limited to, platinum on XC-72 from E-TEK Corp., platinum/ruthenium black, platinum/chromium alloys, and other suitable catalysts.

Having described the electrode casting solution for forming anodes and cathodes for a membrane electrode assembly in a fuel cell, the formation of the membrane electrode assembly will now be described.

With reference to FIG. 1, a membrane electrode assembly 10 may be prepared by forming the proton exchange membrane 12 by casting the sulfonated polymer on a suitable substrate. Using an appropriate electrode casting solution, the anode 14 and cathode 16 may be separately cast on opposing surfaces of the proton exchange membrane 12, thereby forming the membrane electrode assembly 10. The electrode casting solutions for the anode 14 and cathode 16 may also include the water retention additive 18 and an appropriate catalyst 20 for the anode and cathode, such that the water retention additive and catalyst are dispersed in the electrodes during casting on the proton exchange membrane. Alternatively, the electrode casting solution may be used to form decals of the sulfonated polymer which may be subsequently attached to opposing surfaces of the proton exchange membrane.

While the invention has been described in terms of its preferred embodiments, those skilled in the art will recognize that the invention can be practiced with modification within the spirit and scope of the appended claims.

What is claimed is:

1. A membrane electrode assembly, comprising:
an anode that includes a polymer;
a cathode that includes a polymer; and
a proton exchange membrane positioned between the anode and cathode, said proton exchange membrane includes a polymer,
wherein at least one of the anode, the cathode, and the proton exchange membrane comprises a sulfonated copolymer having the following chemical structure:

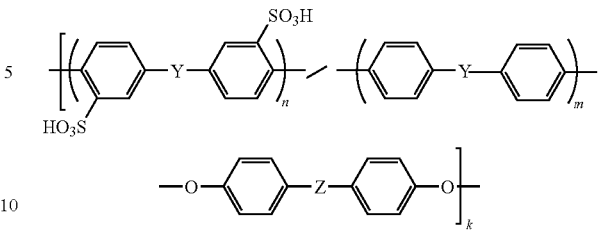

wherein;
n/n+m ranges from about 0.001 to about 1, and (n+m)/k=1.01 in moles;
Y may be —S—, S(O), S(O)$_2$ C(O), or P(O)(C$_6$H$_5$), and combination thereof; and
Z may be a direct carbon-carbon single bond, C(CH$_3$)$_2$, C(CF$_3$)$_2$, C(CF$_3$)(C$_6$H$_5$), C(O), S(O)$_2$, or P(O)(C$_6$H$_5$).

2. The membrane electrode assembly of claim 1, wherein at least one of the anode, the cathode, and the proton exchange membrane comprises an inorganic heteropoly acid.

3. The membrane electrode assembly of claim 2, wherein the inorganic heteropoly acid is selected from the group consisting of phophotungstic acid, phosphomolybdic acid, zirconium hydrogen phosphate, and a zirconium containing heteropoly acid.

4. The membrane electrode assembly of claim 2 wherein the inorganic heteropolyic ranges from about 0.01 to about 60% by weight.

5. The membrane electrode assembly of claim 1 wherein n/n+m ranges from about 0.3 to about 0.6.

6. The membrane electrode assembly of claim 1, wherein Y is S(O)$_2$ and Z is a direct carbon-carbon single bond.

7. The membrane electrode assembly of claim 1, wherein the proton exchange membrane and at least one of the anode and cathode comprise a sulfonated copolymer which is the same.

\* \* \* \* \*